April 13, 1948.  R. W. WALTERS  2,439,552
INDICATOR FOR PLAY OF GYRO ROTORS IN FRAMES
Filed Oct. 23, 1945  3 Sheets-Sheet 3

INVENTOR.
RUSSELL W. WALTERS
BY
ATTORNEY

Patented Apr. 13, 1948

2,439,552

UNITED STATES PATENT OFFICE 2,439,552

INDICATOR FOR PLAY OF GYRO ROTORS IN FRAMES

Russell W. Walters, Cleveland, Ohio, assignor, by mesne assignments, to Jack & Heintz Precision Industries, Inc., Cleveland, Ohio, a corporation of Delaware Application October 23, 1945, Serial No. 624,031

7 Claims. (Cl. 33—174)

This invention relates to precision gauges and has for one of its primary objects to provide a simple, efficient and self-contained unit for measuring the end play of a gyro rotor, or the like, in its suspension frame.

It has become common practice in the art of gyroscopic devices to mount the gyro rotor in bearings in a gimbal suspension frame and to provide a temperature compensation strut, as shown in the United States patent to Ralph M. Heintz, No. 2,301,700, for Rotor, November 10, 1942, for maintaining constant bearing clearance despite variations in temperature.

An object of the present invention is to check the end play of the rotor in its gimbal frame prior to the installation of the compensation strut.

Specifically an object is to provide a unit including a simple means for releasably clamping the gimbal and another simple means for releasably clamping the rotor, the latter means being slidable to move the rotor in either direction along the axis of the rotor and a pair of opposed plungers whose movements, in response to any end play of the rotor when moved in either direction, causes a reading of such end play on a pair of gauges.

With the foregoing and other objects in view, the invention resides in the combination of parts and in the details of construction hereinafter set forth in the following specification and appended claims, a certain embodiment thereof being illustrated in the accompanying drawings, in which:

Figure 1:
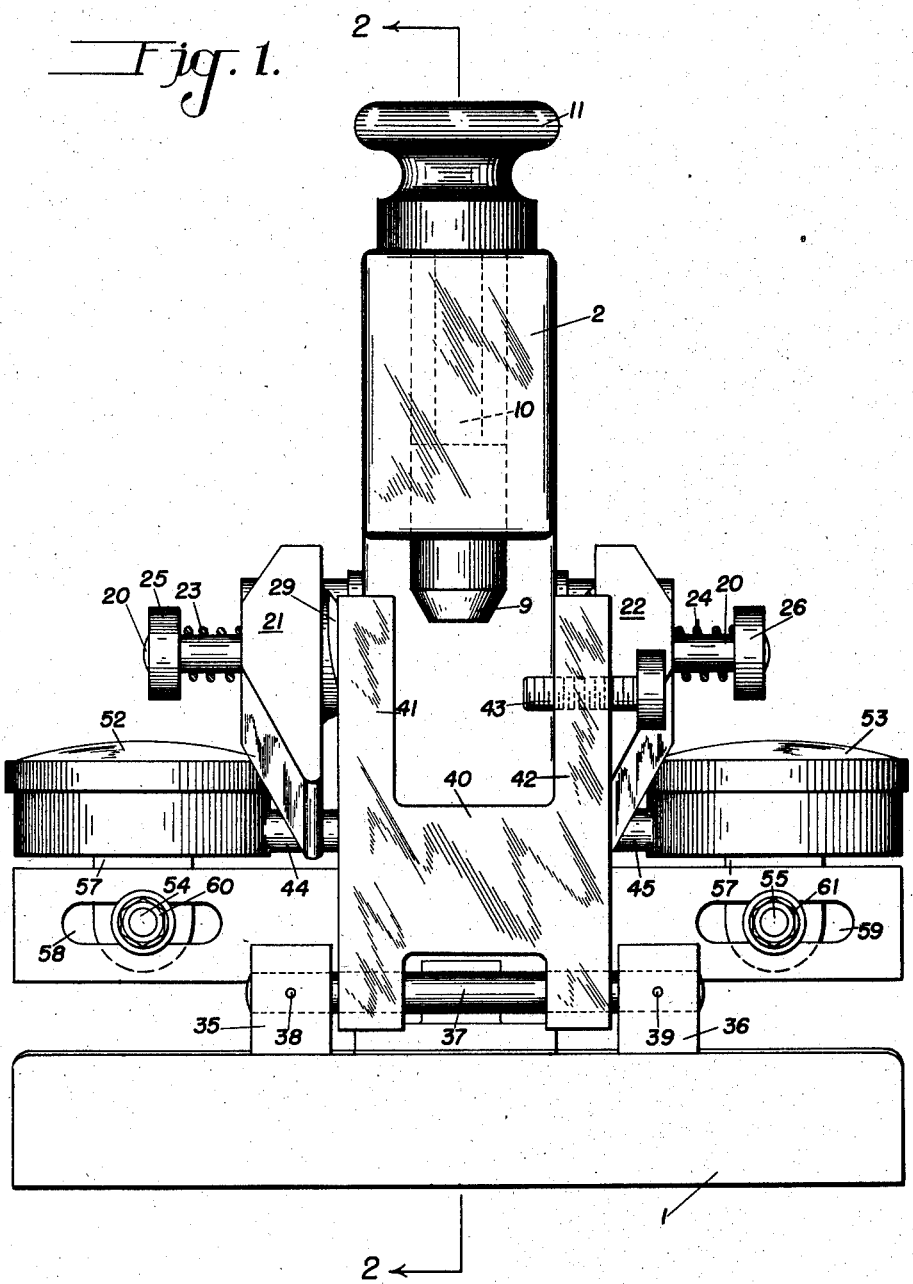
Figure 1 is a view in elevation of the measuring device without the rotor and its gimbal.

Referring more particularly to the drawings, the device may comprise a base 1 and an integral, or rigid standard 2, to which latter is secured a cross piece 3 by bolts 4. The base is provided with a hole 5 to snugly receive the stem 6 of a tapered gimbal centering head 7. The hole 5 may be screw-threaded to receive a screw plug 69 between which and the stem 6 is a compression coil spring 70. The upper portion of standard 2 is also provided with a hole 8 in spaced vertical alignment with hole 5 to receive an opposed tapered gimbal centering head 9, which is rigid with a stem 10 of lesser diameter. Stem 10 is connected to a hand knob 11 by a cross pin 12 and between the upper end of standard 2 and head 9 is a compression coil spring 13 which latter abuts the head 9 which is held from turning by a dowel 62 in holes in standard 2 and knob 11.

Figure 4:
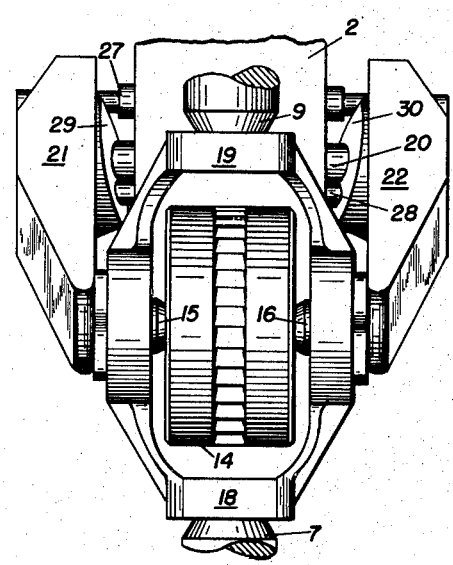
Figure 4 is an enlarged detail view in front elevation of the rotor and gimbal frame, showing the support and clamp for the gimbal frame.

In Figure 4 is shown the conventional gyro rotor 14 which has its bearings supported for rotation upon pivots, or trunnions, 15 and 16 of a gimbal suspension frame 17. The usual mode of support of the gimbal frame is to have its two apertured ends 18 and 19 mounted for pivotal suspension upon a pivoted frame. For present measurement purposes the two centering heads 7 and 9 are brought into clamping engagement, through the action of spring 13, with the two gimbal ends 18 and 19.

Extending through standard 2 is a rod 20 upon which are rotatably mounted a pair of gimbal clamping arms 21 and 22 which are normally forced inwardly on the rod by a pair of compression coil springs 23 and 24 confined by end nuts 25 and 26 to bear inwardly on arms 21 and 22. The outer ends of arms 21 and 22 are slidable inwardly and outwardly on a common guide rod 27. Parallel with rod 20, and extending through standard 2, is a rigid rod 28 which at all times has its opposite ends in engagement with the special opposed cam faces 29 and 30 of the hubs of arms 21 and 22. These cam surfaces are such that when the two arms are swung jointly about their common pivot rod 20 (in a counterclockwise direction, as viewed in Figure 2) to their positions shown in Figures 3 and 4, the coaction of rod 28 with the cam surfaces permits springs 23 and 24 to force arms 21 and 22 to move inwardly to clamp the gimbals in a plane coincidental with the axis of rotation of the rotor on pivots 15 and 16. Joint rotation of arms 21 and 22 in the opposite direction bring the cam faces in such relationship with rod 28 to cause the arms to be spread apart against the action of springs 23 and 24.

In addition to the centering feature of the gimbal frame by centering head 7 and the plunger centering head 9, there may be provided a stationary block 31 in which is slidably mounted the stem 32 of a spring pressed plunger having a partially bevelled head 33 normally urged by a compression coil spring 34 jointly against the adjacent ends of the gimbal 17 and the centering head 7.

Figure 2:
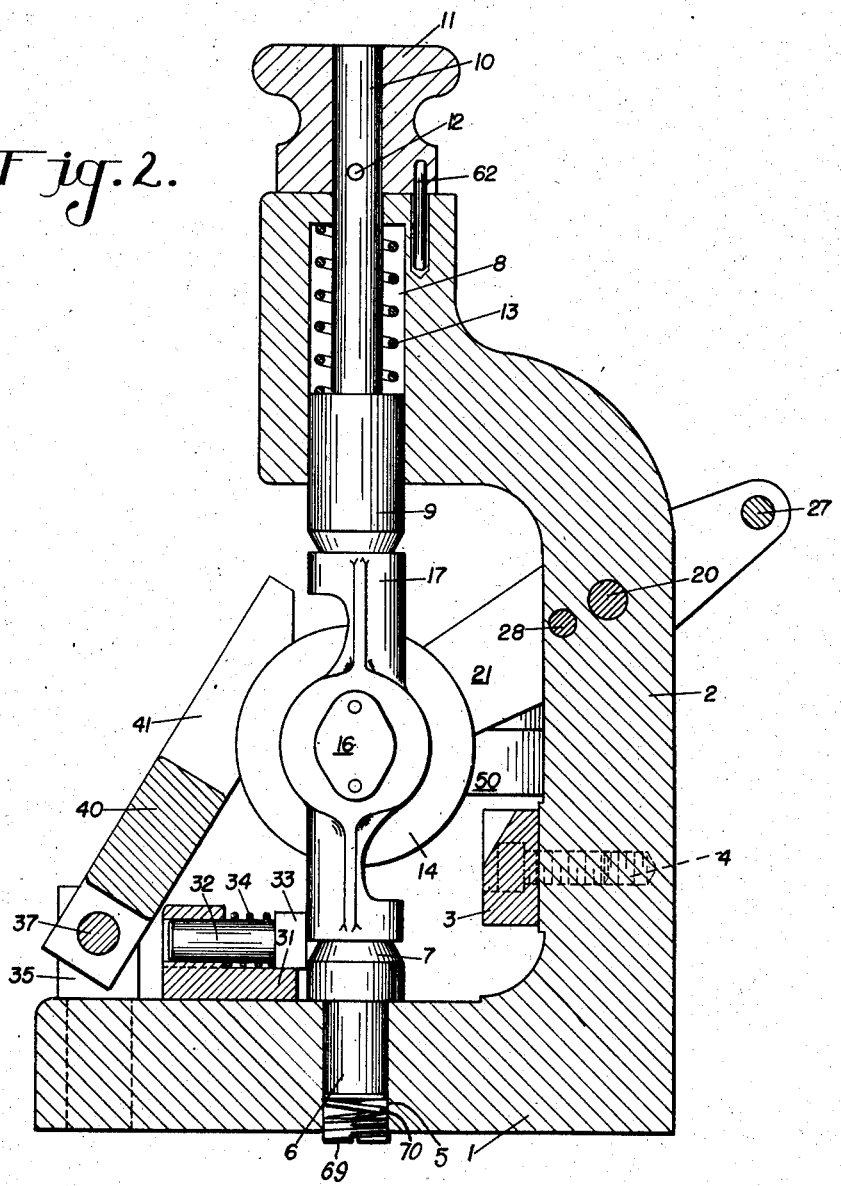
Figure 2 is a view in vertical section taken along line 2—2 of Figure 1 showing, in elevation, the gimbal and rotor supported thereby for measurement.
Figure 3:
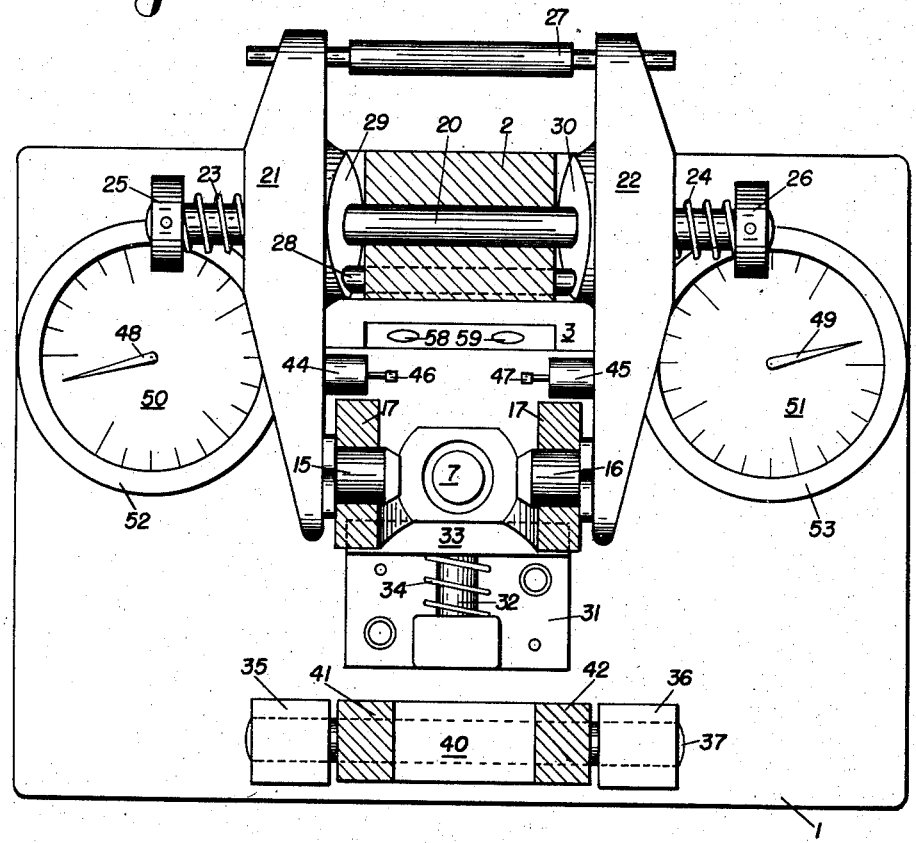
Figure 3 is a view in top plan, partly in cross section, of the device with the rotor omitted.

As shown in Figures 2 and 3, the spring pressed head 33 simultaneously abuts gimbal 17 and the centering head 7 so as to assist spring 13 and centering head 9 and spring 10 and centering head 7 center the gimbal.

The above described arrangement refers to the means for support, centering and clamping of the gimbal frame. As stated before the purpose of the device is to check the end play of the rotor in the gimbal. The gimbal, with its rotor mounted therein, having been centered and clamped as described, the following construction and mode of operation is preferably employed for checking the end play of the rotor in the gimbal. Rigid with the base are a pair of bearing brackets 35 and 36 to support a rod 37 pinned thereto at 38 and 39. Rotatable about rod 37 and longitudinally slidable thereon is a plate 40 having divided arms 41 and 42. Arm 42 is screw-threaded to receive a manual adjustment bolt 43 extending inwardly thereof. The operation entails the swinging of plate 40 in a clockwise direction, as viewed in Figure 2 which brings arms 41 and 42 into spaced relationship with the opposite side faces of the gyro rotor. The hand bolt 43 is then screwed inwardly until the rotor is clamped between bolt 43 and arm 41. This having been done, the plate 40 is moved alternately to the left and right slidably upon rod 37. Inasmuch as the gimbal has been centered and clamped and the rotor also clamped between bolt 43 and arm 41 of plate 40, the possibility of sliding movement of plate 40 on rod 37 is positive indication of end play of the rotor in the gimbal.

In order to measure and indicate such end play, there is provided a pair of opposed plungers operating in cylinders 44 and 45, the plungers being suitably spring pressed oppositely inwardly in such a manner that the two plunger heads 46 and 47 positively engage the opposite faces of the rotor. By any suitable means, any sliding movement of either plunger will cause movement of its corresponding pointer 48 or 49 on the scale 50 or 51 of a gauge 52 or 53. Gauges 52 and 53 may be adjustably secured by bolts 54 and 55 on gauge brackets 56 and 57 extending through elongated slots 58 and 59 in cross arm 3 and held by nuts 60 and 61.

From the foregoing it will be seen that there has been provided a simple, inexpensive, self-contained and efficient unit for measuring the end play of a gyro rotor, or the like, in a gimbal, or other suspension frame. The centering of the gimbal frame is accomplished by the spring operated centering head 9 and the stationary centering head 7 with the aid of plunger head 33 engaging the latter and the gimbal 17. The gimbal frame is effectively clamped by the action of the spring and cam operated clamping arms 21 and 22. The rotor is effectively clamped by the arm 41 and bolt 43 of the plate 40. Plate 40 is slidable to check the existence of end play of the rotor in the gimbal and the two gauges 52 and 53 operated by the plunger heads 46 and 47 readily and visually indicate such end play.

I claim:

1. A device for measuring and indicating the end play of a rotor in its suspension frame, a supporting frame, a supporting means engaging the opposite sides of said suspension frame in the plane of rotation of said rotor for centering and clamping said suspension frame in said supporting means, clamping means for engaging the opposite sides of said suspension frame coincidental with the axis of said rotor, means for engaging in clamped relation the opposite side faces of said rotor, said rotor clamping means being also slidable in a plane parallel with the axis of said rotor to determine the existence of end play of said rotor in said suspension frame and gauges including members engaging the side faces of said rotor and responsive to side movements of said rotor upon manual side pressure on said slidable rotor clamping means to visually indicate the end play of said rotor in said suspension frame.

2. A device for measuring and indicating the end play of a rotor in its suspension frame, a supporting frame, a supporting means for resiliently engaging the opposite sides of said suspension frame in the plane of rotation of said rotor for centering and clamping said suspension frame in said supporting means, swingable clamping means for engaging the opposite sides of said suspension frame coincidental with the axis of said rotor, swingable adjustable means for engaging in clamped relation the opposite side faces of said rotor, said rotor clamping means being also slidable in a plane parallel with the axis of said rotor to determine the existence of end play of said rotor in said suspension frame and gauges including members engaging the side faces of said rotor and responsive to side movements of said rotor upon manual side pressure on said slidable rotor clamping means to visually indicate the end play of said rotor in said suspension frame.

3. A device for measuring and indicating the end play of a rotor in its suspension frame, a supporting frame, a supporting means for resiliently engaging the opposite sides of said suspension frame in the plane of rotation of said rotor for centering and clamping said suspension frame in said supporting means, additional resilient means for embracing and engaging said suspension frame and said supporting means for centering said suspension frame in said supporting means, swingable clamping means for engaging the opposite sides of said frame coincidental with the axis of said rotor, swingable adjustable means for engaging in clamped relation the opposite side faces of said rotor, said rotor clamping means being also slidable in a plane parallel with the axis of said rotor to determine the existence of end play of said rotor in said suspension frame and gauges including members engaging the side faces of said rotor and responsive to side movements of said rotor upon manual side pressure on said slidable rotor clamping means to visually indicate the end play of said rotor in said suspension frame.

4. A device for measuring and indicating the end play of a rotor in its suspension frame, a supporting frame, a supporting means for resiliently engaging the opposite sides of said suspension frame in the plane of rotation of said rotor for centering and clamping said suspension frame in said supporting means, clamping means including resiliently cam actuated swingable clamping arms for engaging the opposite sides of said suspension frame coincidental with the axis of said rotor, swingable adjustable means for engaging in clamped relation the opposite side faces of said rotor, said rotor clamping means being also slidable in a plane parallel with the axis of said rotor to determine the existence of end play of said rotor in said suspension frame and gauges including members engaging the side faces of said rotor and responsive to side movements of said rotor upon manual side pressure on said slidable rotor clamping means to visually indicate the end play of said rotor in said suspension frame.

5. A device for measuring and indicating the end play of a rotor in its suspension frame, a supporting frame, a supporting means for resiliently engaging the opposite sides of said suspension frame in the plane of rotation of said rotor for centering and clamping said suspension frame in said supporting means, swingable clamping means for engaging the opposite sides of said suspension frame coincidental with the axis of said rotor, means including a plate with a pair of arms, one having an adjustable member for engaging the opposite side faces of said rotor between one arm and said adjustable member in clamped position, said rotor clamping means being also slidable in a plane parallel with the axis of said rotor to determine the existence of end play of said rotor in said suspension frame and gauges including members engaging the side faces of said rotor and responsive to side movements of said rotor upon manual side pressure on said slidable rotor clamping means to visually indicate the end play of said rotor in said suspension frame.

6. A device for measuring and indicating the end play of a rotor in its suspension frame, a supporting frame, a supporting means for resiliently engaging the opposite sides of said suspension frame in the plane of rotation of said rotor for centering and clamping said suspension frame in said supporting means, clamping means including resiliently cam actuated clamping arms for engaging the opposite sides of said suspension frame coincidental with the axis of said rotor, means including a plate with a pair of arms, one having an adjustable member for engaging the opposite side faces of said rotor between one arm and said adjustable member in clamped position, said rotor clamping means being also slidable in a plane parallel with the axis of said rotor to determine the existence of the end play of said rotor in said suspension frame and gauges including members engaging the side faces of said rotor and responsive to side movements of said rotor upon manual side pressure on said slidable rotor clamping means to visually indicate the end play of said rotor in said suspension frame.

7. A device for measuring and indicating the end play of a rotor in its suspension frame, a supporting frame, a supporting means for resiliently engaging the opposite sides of said suspension frame in the plane of rotation of said rotor for centering and clamping said suspension frame in said supporting means, clamping means including resiliently cam actuated clamping arms for engaging the opposite sides of said suspension frame coincidental with the axis of said rotor, means including a plate with a pair of arms, one having an adjustable member for engaging in the opposite side faces of said rotor between one arm and said adjustable member in clamped position, said rotor clamping means being also slidable in a plane parallel with the axis of said rotor to determine the existence of end play of said rotor in said suspension frame, additional resilient means for engaging said suspension frame and said supporting means for centering said suspension frame in said supporting means and gauges including members engaging the side faces of said rotor and responsive to side movements of said rotor upon manual side pressure on said slidable rotor clamping means to visually indicate the end play of said rotor in said suspension frame.

RUSSELL W. WALTERS.

REFERENCES CITED

The following references are of record in the file of this patent:

UNITED STATES PATENTS

| Number | Name | Date |
| --- | --- | --- |
| 1,062,566 | Gohlke et al. | May 20, 1913 |
| 1,317,459 | Rouanet | Sept. 30, 1919 |
| 1,319,361 | Rouanet | Oct. 21, 1919 |
| 2,170,493 | Clapper | Aug. 22, 1939 |
| 2,301,700 | Heintz | Nov. 10, 1942 |